(12) United States Patent
Niccolai

(10) Patent No.: US 8,858,293 B2
(45) Date of Patent: Oct. 14, 2014

(54) RECIPROCATING MECHANISM

(75) Inventor: Gabriele Niccolai, San Donnino di Campi Bisenzio (IT)

(73) Assignee: Artisians of Florence Pty Ltd (AU)

( * ) Notice: Subject to any disclaimer, the term of this patent is extended or adjusted under 35 U.S.C. 154(b) by 1036 days.

(21) Appl. No.: 12/798,642

(22) Filed: Apr. 7, 2010

(65) Prior Publication Data

US 2011/0162467 A1 Jul. 7, 2011

(30) Foreign Application Priority Data

Jan. 6, 2010 (AU) .................................. 2010200035

(51) Int. Cl.
*A63H 11/00* (2006.01)
*F16H 35/00* (2006.01)
(52) U.S. Cl.
CPC ...................................... *F16H 35/00* (2013.01)
USPC .............................................. 446/330; 73/53
(58) Field of Classification Search
USPC ................................................ 446/330; 74/53
See application file for complete search history.

(56) References Cited

U.S. PATENT DOCUMENTS

| | | | | |
|---|---|---|---|---|
| 5,147,238 | A * | 9/1992 | Kelley et al. ................. | 446/330 |
| 6,071,170 | A * | 6/2000 | How ............................. | 446/330 |
| 6,244,925 | B1 * | 6/2001 | Chou ............................ | 446/354 |
| 6,416,380 | B1 * | 7/2002 | Li-Wen ........................ | 446/353 |

OTHER PUBLICATIONS

Rosheim, Prior Art Rosheim model, 2002.*
Leonardo DaVinci Exhibition handbook (2009) "Anatomy to Robots."
Rosheim (2006) "Leonardo's Lost Robots." Springer-Verlag Berlin Heidelberg, Chapter 3, pp. 69-113.
Starnazzi (2006) "Leonardo: Codices & Machines" Cartei & Bianchi.

* cited by examiner

*Primary Examiner* — Michael Dennis
(74) *Attorney, Agent, or Firm* — Quine Intellectual Property Law Group, P.C.

(57) ABSTRACT

The present invention relates to a reciprocating mechanism. In particular, the invention relates to a reciprocating mechanism suitable for use in a robot, wherein the robot is capable of performing a drumming action. In specific embodiments, the mechanism includes: (i) a substantially fan (triangular)- or wedge-shaped member having a pivot, a follower end and a distal end, wherein the distal end includes a plurality of teeth; (ii) a guide cylinder having a serpentine guide means around a curved surface of the guide cylinder, wherein the follower end engages with the serpentine guide means such that as the guide cylinder is rotated the follower end traverses the curved surface; and (iii) a central pulley member having teeth that mesh with the teeth of the distal end; wherein movement of the follower end is translated into movement of a distal end via the pivot of the fan (triangular)-shaped member, and wherein movement of the distal end causes movement of the central pulley member via their meshed teeth.

7 Claims, 4 Drawing Sheets

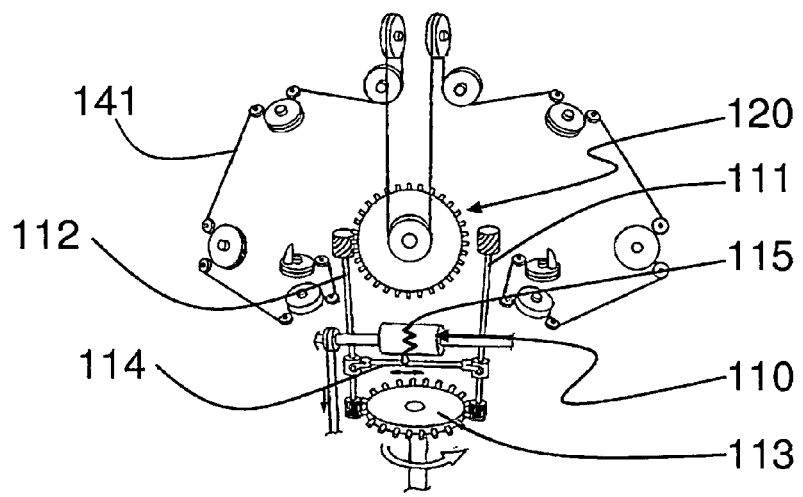
Figure 2 – Prior art
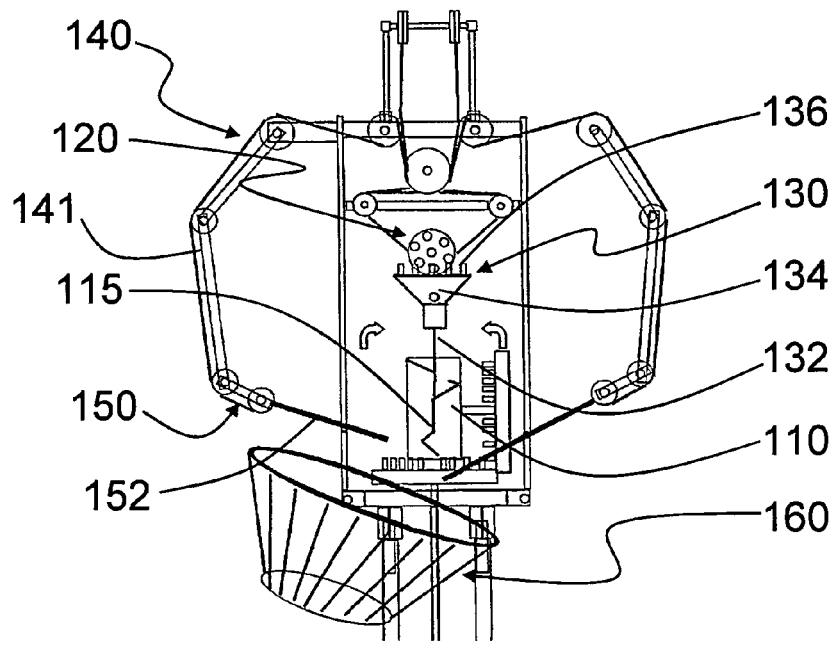
Figure 3

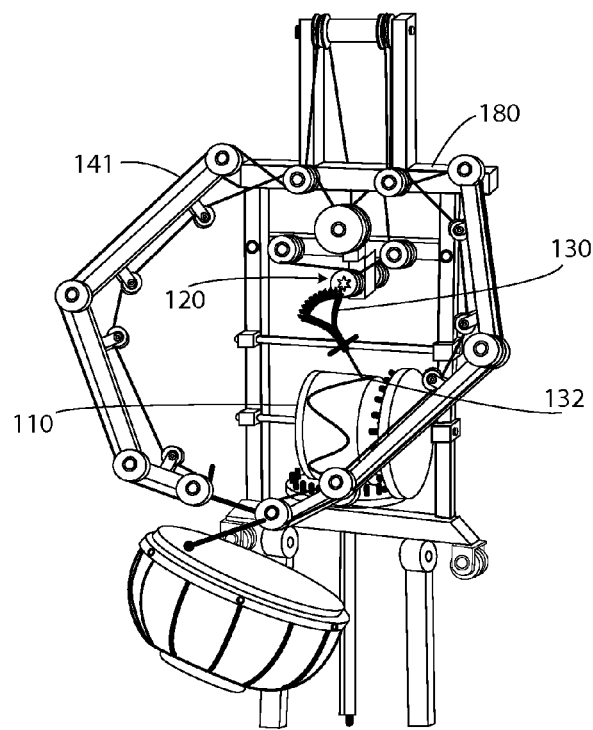
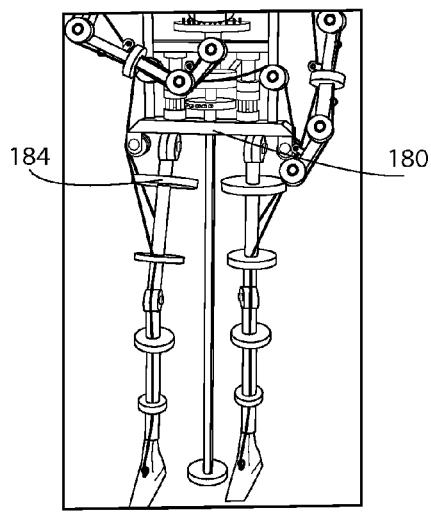
Fig. 6
Fig. 7
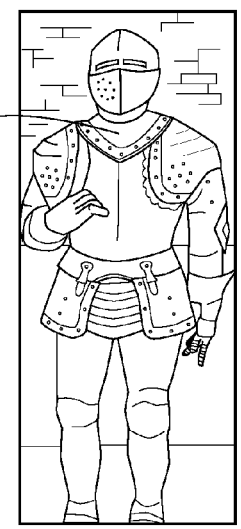
Fig. 8

RECIPROCATING MECHANISM

CROSS REFERENCE TO RELATED APPLICATIONS

This application claims priority to and benefit of Australian Application 2010200035, entitled "RECIPROCATING MECHANISM" by Gabriele Niccolai filed Jan. 6, 2010. This prior application is incorporated by reference in its entirety.

FIELD OF THE INVENTION

The present invention relates to a reciprocating mechanism. In particular, the invention relates to a reciprocating mechanism suitable for use in a robot, wherein the robot is capable of performing a drumming action.

BACKGROUND TO THE INVENTION

Leonardo da Vinci (1452-1519) was a man of many talents including: scientist, mathematician, engineer, inventor, anatomist, painter and sculptor. Da Vinci is revered for his technological ingenuity. He conceptualized a helicopter, a tank, concentrated solar power, a calculator, the double hull and outlined a rudimentary theory of plate tectonics. However, relatively few of his designs were constructed or were even feasible during his lifetime, but some of his smaller inventions, such as an automated bobbin winder and a machine for testing the tensile strength of wire, entered the world of manufacturing unheralded. As a scientist, he greatly advanced the state of knowledge in the fields of anatomy, civil engineering, optics, and hydrodynamics.

A codex of da Vinci's works was collated by Pompeo Leoni, in the late 16$^{th}$ century, called the Codex Atlanticus. It is a twelve-volume, bound set of 1,119 pages of drawings and writings dating from about 1478 to 1519. The contents of the codex cover a variety of subjects, including flight, weaponry, musical instruments, mathematics and botany.

Within the Codex Atlanticus, at folio 579r, there are plans for a "mechanical knight" as determined by Carlo Pedretti in 1957. Like many of da Vinci's designs, building the knight has proven a difficult and controversial exercise. The first attempt to construct it was in 2002 by Mark Rosheim for a television documentary. Since then, many exhibitions and museums of da Vinci's models have included a knight labelled, "Leonardo's robot". However, those models do not correspond to the drawings found in folio 579r. Various workers in the field have indicated that, in addition to 579r, folios 1077r, 1021r and 1021v contain additional information for the construction of a functional knight/robot.

The present invention seeks to provide a workable solution to the mechanism of da Vinci's robot in particular, one based on a number of sketches from folio 579r.

SUMMARY OF THE INVENTION

The present invention provides a reciprocating mechanism suitable for use in a drumming robot, including: (i) a substantially fan (triangular)- or wedge-shaped member having a pivot, a follower end and a distal end, wherein the distal end includes a plurality of teeth; (ii) a guide cylinder having a serpentine guide means around a curved surface of the guide cylinder, wherein the follower end engages with the serpentine guide means such that as the guide cylinder is rotated the follower end traverses the curved surface; and (iii) a central pulley member having teeth that mesh with the teeth of the distal end; wherein movement of the follower end is translated into movement of a distal end via the pivot of the fan (triangular)-shaped member, and wherein movement of the distal end causes movement of the central pulley member via their meshed teeth.

The present invention also provides a drumming robot based on the drawings of Leonardo da Vinci's Codex Atlanticus folio 579r, comprising: (i) the reciprocating mechanism of the present invention; (ii) a substantially humanoid support frame, including pulley means located at positions corresponding to any one or more of shoulder, elbow, wrist and hand; (iii) two strike members, each at an end of each of two arm members, wherein the strike members are pivotable between a striking position and a ready position; (iv) a belt means connectable to the strike members and cooperating with the pulley means and the central pulley member; wherein rotation of the central pulley member causes displacement of the belt means and thereby effects movement of the strike members between the striking position and the ready position.

BRIEF DESCRIPTION OF THE DRAWINGS

FIG. 2 shows a diagrammatic reconstruction of the inner workings of the arms of the prior art Rosheim model.

FIG. 3 shows a diagrammatic representation of the mechanism of the arms of an embodiment of the present invention.

FIG. 6 shows the mechanism of the arms of another embodiment of the present invention.

FIG. 7 shows the construction of the legs of another embodiment of the present invention.

FIG. 8 shows an embodiment of the present invention wherein the robot is enclosed in a suit of armour.

DETAILED DESCRIPTION OF THE INVENTION

As used herein, the term "robot" refers to an automaton. It is intended to encompass the underlying mechanisms that allow the automaton to function as well as a complete automaton with essentially human appearance. It should also be noted that the term "robot" is in no way intended to indicate a function of the automaton. In particular, folio 579r referred to above has been variously described as giving plans for a knight, soldier, warrior and robot. The term "robot" will be used herein.

Figure 1:
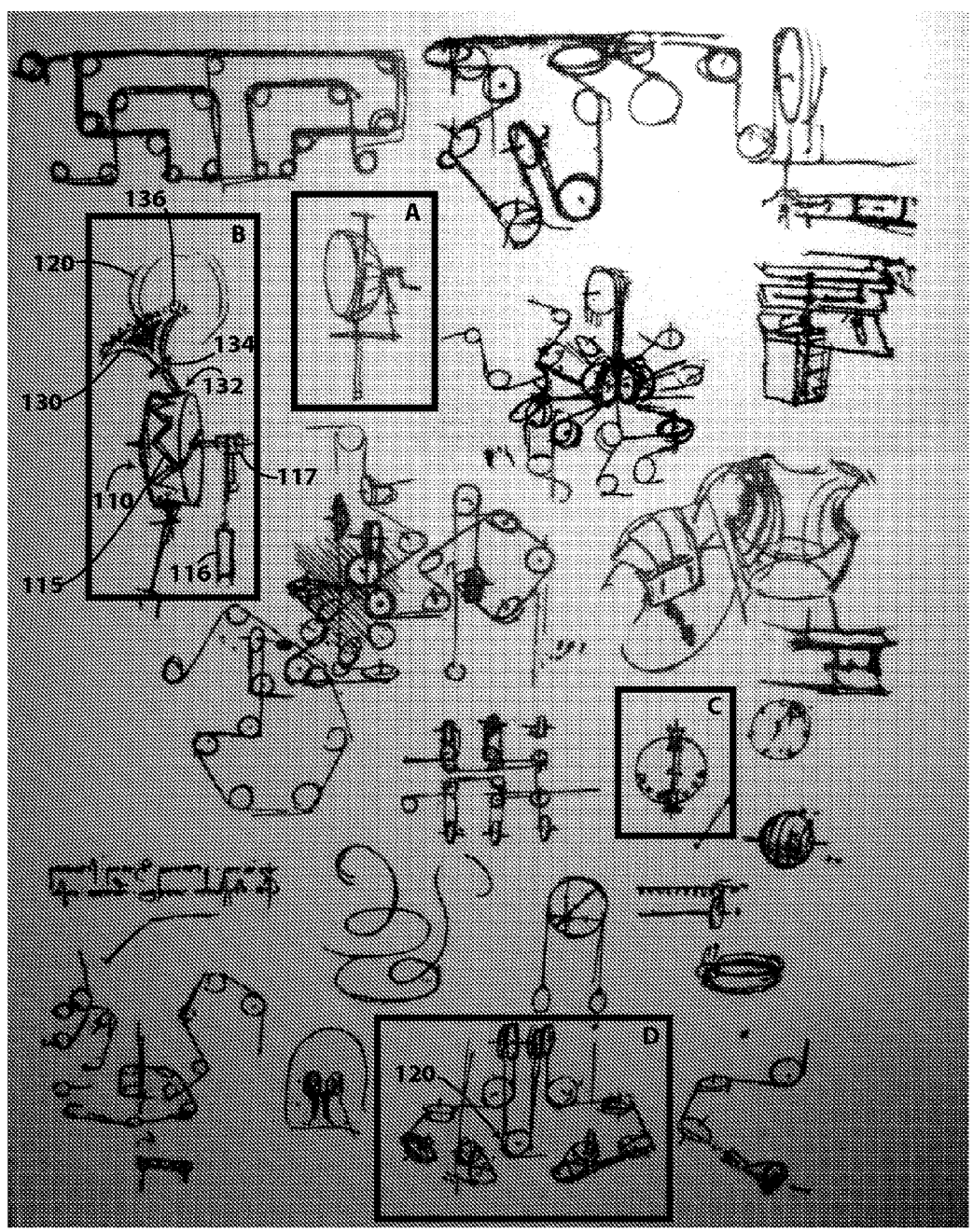
FIG. 1 shows an excerpt of Codex Atlanticus folio 579r.

In one embodiment, the present invention provides a robot that is capable of beating a drum. In particular, the robot is based largely on the disclosure of Leonardo da Vinci's Codex Atlanticus folio 579r (FIG. 1). It can be seen that the drawings do not clearly disclose any particular character or purpose for the mechanisms shown, however, they have been assumed by various workers to be for a knight, soldier, warrior and robot. While the drawings for the robot were made approximately 500 years ago, they were not interpreted until the 1960s, and a working model not made until 2002. A detailed account of the construction of the first working model can be found in "*Leonardo's Lost Robots*" (2006, Springer Berlin Heidelberg) by Mark Elling Rosheim.

The present invention differs from the "Rosheim" model in a fundamental way. While studying the da Vinci drawings, Rosheim assumed that the arms and/or hands would always move in opposite directions, and that such movement could be used to beat a drum or swing the arms as the robot walked. However, he did not illustrate, demonstrate or prove this assumption. Instead, he went on to devise and construct a complex arrangement of ropes and pulleys whereby the arms and/or hands could be moved independently. Rosheim ultimately concludes that the most likely use for the robot would be for "grabbing at someone with its arms in a bear hug."

The present invention does not follow Rosheim's interpretation. The robot of the present invention does not import additional features and the "hands" move to beat a drum. Accordingly, the present invention provides a drumming robot based on the drawings of Leonardo da Vinci's Codex Atlanticus folio 579r, wherein the alternating movement of the hands is provided by a substantially fan- or wedge-shaped member in cooperation with a guide cylinder having a serpentine guide means around its curved surface, such that as the guide cylinder is rotated, a follower end of the fan-shaped member which engages with the guide means, follows the guide means. The fan-shaped member is able to reciprocate about a pivot so that movement of the follower end is translated into movement of a distal end, wherein the distal end includes a plurality of teeth which are able to mesh with teeth on a central pulley member, and the central pulley member activates motion of the hands via belt means attached thereto.

In both the prior art model and the present invention, the alternating direction of rotation of the central pulley member imparts an alternating movement to the arms and/or hands of the robot.

Accordingly, the present invention provides a reciprocating mechanism suitable for use in a drumming robot, including: (i) a substantially fan-shaped member having a pivot, a follower end and a distal end, wherein the distal end includes a plurality of teeth; (ii) a guide cylinder having a serpentine guide means around a curved surface of the guide cylinder, wherein the follower end engages with the serpentine guide means such that as the guide cylinder is rotated the follower end traverses the curved surface; and (iii) a central pulley member having teeth that mesh with the teeth of the distal end; wherein movement of the follower end is translated into movement of a distal end via the pivot of the fan-shaped member, and wherein movement of the distal end causes rotation of the central pulley member via their meshed teeth.

Figure 5:
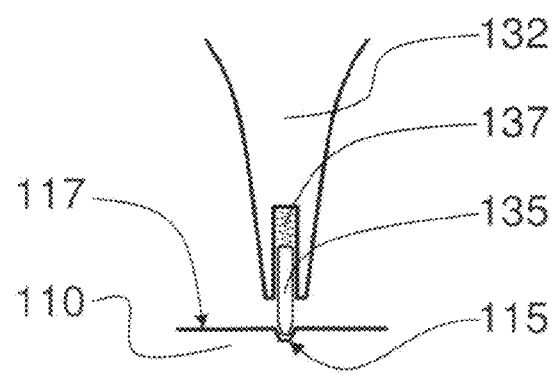
FIG. 5 shows a cut-away view of an embodiment of the fan shaped member wherein the follower end includes engagement means.

In certain embodiments of the present invention, the serpentine guide means is a groove around the curved surface of the guide cylinder. In such embodiments, the follower end of the fan-shaped member includes engagement means (e.g., engagement means 135 of FIG. 5) such as a correspondingly shaped nib-like structure which is adapted to engage with the groove and follow the groove as the cylinder rotates, thereby translating the shape of the serpentine guide means into corresponding movement of the fan-shaped member.

In further embodiments of the present invention, the serpentine guide means is a raised ridge around the curved surface of the guide cylinder. In such embodiments, the follower end of the fan-shaped member includes an engagement means such as a correspondingly shaped groove with which to engage the raised ridge as the cylinder rotates. Such an arrangement similarly translates the shape of the serpentine guide means into corresponding movement of the fan-shaped member.

Due to the pivot in the fan-shaped member, the follower end traces an arc as it follows the guide means across the general width of the curved surface of the guide cylinder. This arrangement results in the follower end being further from the guide cylinder when at the guide means directs the follower end to the periphery of the guide cylinder. At such positions, the engagement means may not contact/engage the guide means. There are at least three optional solutions if the engagement means does not satisfactorily engage the guide means across the full width of the guide cylinder. In one embodiment, the engagement means located at the follower end is locatable upon, preferably receivable within, the follower end and further includes an urging means (e.g., urging means 137 of FIG. 5) such that when the follower end is substantially centrally located in or on the guide cylinder the engagement means is at least partially within the follower end and the urging means is compressed. As the follower end moves towards the periphery of the guide cylinder, the urging means urges the engagement means from the follower end such that the engagement means remains in substantial contact with the guide means across the entire width of the guide cylinder. The urging means may be as simple as a spring member. In a second embodiment, the engagement means may be in telescopic cooperation with the follower end, such that the engagement means is capable of sliding over, sliding into or sliding beside the follower end. Again, an urging means may be required to maintain substantial contact between the engagement means and the guide means. In a third embodiment, the guide means may be adapted such that the guide cylinder receives the engagement means within a groove that is deep enough to accommodate engagement means at the centre of the guide cylinder. In this embodiment, the groove may be deeper near the centre of the guide cylinder than at the periphery, or the groove may be the same depth across the cylinder such that the depth at the centre is sufficient to accommodate the engagement means. Further alternative solutions to this potential problem are also intended to be encompassed by the present invention. For example, the guide cylinder may have a smaller radius at its centre, so that, similar to the last embodiment described above, the guide means is effectively at a constant radial distance from the pivot of the fan-shaped member.

While the present invention is described with respect to a drumming robot, the reciprocating mechanism may find application in a number of situations and those applications of the mechanism are intended to be encompassed by the present invention. The skilled addressee would readily recognise the general applicability of the mechanism of the present invention.

Figure 4:
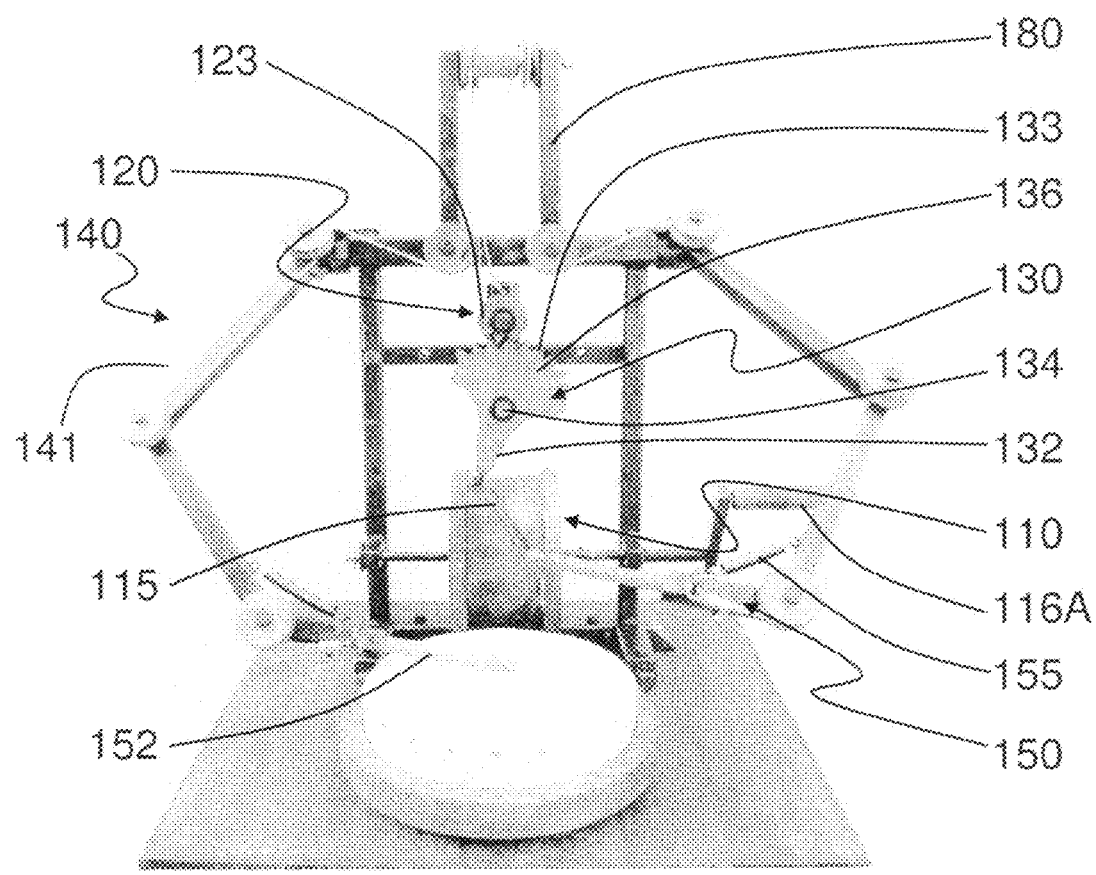
FIG. 4 shows the mechanism of the arms of a further embodiment of the present invention.

A belt means is used to translate movement of the central pulley member into movement of the strike members. The belt means traverses the various pulley means and is movable by rotation of the central pulley member. The belt means may connect the two strike members substantially as illustrated in FIGS. 3 and 4. In these embodiments, the belt means is used to move the strike members from the ready position to the striking position, and a biasing means is used to return the strike members to the ready position from the striking position. In an alternative embodiment of the present invention, the belt means may be a loop substantially as illustrated in FIG. 6. In such embodiments, the belt means is used to move the strike members between the striking and ready positions. The belt means may be made of any suitable material, so long as it is strong enough to withstand the considerable forces required to activate the strike members via the various pulley means. For example, the belt means may be made of rope, cable, string, wire or any other suitable material. Preferably, the belt means is rope, to be in keeping with the period of the original drawings by da Vinci.

In a robot of the present invention, a frame is normally employed to support the various components. The frame is substantially humanoid in structure having a torso region to which the guide cylinder, fan-shaped member and central pulley member can be attached. There are also fixed arm structures that terminate in a pivoting wrist to which each strike member is attached. In certain embodiments the robot may further include leg members.

In order to have a drumming action, the hands of the robot need to move from a ready position to a striking position, wherein the change of position is referring to the hands pivoting at the wrist position of the arms, and the position names refer to the actions required to strike a drum, whether or not the drum is present.

During the evolution of the present invention, the inventors constructed many variations of the illustration shown in the codex shown in FIG. 1. Many previous workers had assumed that the automaton could perform a large number of functions. However, those models were found to have very high friction that made impossible the operation of the automaton. In the herein described invention, the inventors found a mechanism with a rhythmic programme driving the belt means directed by pulleys to the movement of the wrist of the arm that provided the automation of the drumming action. By adjusting the shape of the serpentine guide means the robot can be programmed to hit the drum with more or less force or speed for a given speed of rotation of the guide cylinder. With the present invention other mechanical problems are minimized and the device maintains a steady and reliable operation.

Referring to all the Figures wherein like reference numerals designate like or corresponding parts throughout the several views. FIGS. 3 to 8 represent single, exemplary embodiments of the present invention and are not intended to limit the scope of the present invention.

FIG. 1 shows a part of folio 579r from the Codex Atlanticus. The four marked regions are particularly relevant to the functioning of the present invention. Regions A, B and D were determined as relevant to the drumming action of the arms and/or hands, while Region C may represent an alternative mechanism for alternating arm movement. Region A is believed to show a drum, in a frame, which is intended to be struck by the robot. The present inventors are the first to have interpreted this illustration in this manner. Region B shows part of one form of the mechanism by which the present invention achieves its alternating motion—explained further below. This Region also indicates how the robot may be powered, by a rope and weight 116 wrapped round the axle 117 upon which the guide cylinder 110 is positioned. Region D shows the pulley means arrangement for movement of the arms and/or hands of the robot.

As shown in FIG. 2, the prior art "Rosheim" model, while using a guide cylinder 110 to provide an alternating motion, does so by alternating which drive shaft 111, 112 is used to direct drive from the drive cog 113 to the central pulley member 120. This is achieved by the drive shafts 111, 112 being pivoted, and movable about those pivots by a reciprocating arm 114 which links the drive shafts 111, 112, which engages with the guide means 115 in the guide cylinder 110. Only one of the drive shafts can interact with and drive the central pulley member 120 at any time, but both are continuously driven by the drive cog 113. By alternating which drive shaft 111, 112 drives the central pulley member 120, an alternating direction of rotation of the central pulley member 120 is achieved, thereby imparting alternating movement to the arms and/or hands. In this model, both the drive cog 113 and the guide cylinder 110 must be driven in order to achieve movement of the arms and/or hands.

In contrast, the mechanism of the present invention is a simpler device. As illustrated in FIGS. 3 to 6, it is only necessary for the guide cylinder 110 to be driven in order to achieve movement of the arms and/or hands of the robot. This is clear, especially in FIG. 4, where a handle 116A for rotating the guide cylinder 110 is shown. The follower end 132 of the fan-shaped member 130 is positioned within the guide means 115 of the guide cylinder 110. As the guide cylinder 110 rotates, the follower end 132 follows the guide means 115 from one side of the guide cylinder 110 to the other. In doing so, the fan-shaped member 130 rotates about a pivot 134 and imparts motion to the distal end 136. The distal end 136 includes a plurality of teeth 133 which mesh with complementary teeth 123 on the central pulley member 120. When the distal end 136 moves, that movement is transferred to the central pulley member 120 via their meshed teeth 123, 133. It can be seen that by the reciprocating motion of the fan-shaped member 130, the central pulley member 120 will be rotated in alternate directions, thereby imparting alternating movement to the belt means 141 and thus the arms 140 and/or hands/strike members 150.

Movement of the arms 140 and/or hands/strike members 150 is achieved by a belt means 141 passing around the central pulley member 120, around further pulley means 182 at positions corresponding to shoulders, elbows and wrists etc and terminating at a strike member 150. In the embodiments of the present invention illustrated in FIGS. 3 and 4, the pulling of the belt means by the central pulley member 120 results in a shortening of the belt means, whereby the strike member 150 is caused to swing. Movement of the strike member 150 causes a drumstick 152 or similar to be brought into contact with a drum 160. Upon alternation of the direction of rotation of the central pulley member 120, tension on the belt means is released and the strike member 150 returns to a ready position under the action of a biasing means 155, such as a spring as illustrated. In doing so, the other strike member 150 is moved to the striking position in turn. In an alternative embodiment of the present invention, illustrated in FIG. 6, the belt means does not terminate at the strike member 150, but is routed back to the central pulley member 120 wherein pulling of the belt means is used to move the drumstick 152 into contact with the drum 160, as well as away from the drum 160, without the need for a biasing means 155.

As illustrated in FIGS. 7 and 8, certain embodiments of the present invention include spacer means 184 attached to the limbs. The spacer means 184 may be substantially sized to allow the robot to be accommodated within a suit of armour 190. The spacer means 184 are intended to be placed upon and may substantially encircle the limb to which they are attached, and in a plane substantially perpendicular to the long axis of the limb. Such spacer means 184 may be attached to any one or more of the arms, torso, neck and legs of the support frame 180 making up the robot. It is envisaged that the spacer means 184 which are preferably disc-shaped and may include orifices through which belt means 141 may pass so as to allow the support frame 180 and attached components to function even when housed within a suit of armour 190. Accordingly, the suit of armour 190 is a further optional feature of a robot according to the present invention. The spacer means 184 may be positioned upon the support frame 180 to impart a substantially humanoid appearance to the robot, in that the spacer means 184 may be used to represent, for example, muscles such as calves, thighs, biceps, triceps and the like.

Where the terms "comprise", "comprises", "comprised" or "comprising" are used in this specification, they are to be interpreted as specifying the presence of the stated features, integers, steps or components referred to, but not to preclude the presence or addition of one or more other feature, integer, step, component or group thereof.

Further, any prior art reference or statement provided in the specification is not to be taken as an admission that such art constitutes, or is to be understood as constituting, part of the common general knowledge.

All references cited herein are incorporated by reference.

I claim:

1. A reciprocating mechanism, including:
    a substantially triangular-shaped member having a pivot, a follower end and a distal end, wherein the distal end includes a plurality of teeth;
    a guide cylinder having a serpentine guide means around a curved surface of the guide cylinder, wherein the follower end engages with the serpentine guide means such that as the guide cylinder is rotated the follower end traverses the curved surface; and
    a central pulley member having teeth that mesh with the teeth of the distal end;
    wherein movement of the follower end is translated into movement of the distal end via the pivot of the triangular-shaped member, and wherein movement of the distal end causes rotation of the central pulley member via their meshed teeth.

2. The reciprocating mechanism of claim 1, wherein the follower end engages the guide means via an engagement means.

3. The reciprocating mechanism of claim 2, wherein the engagement means is locatable upon the follower end of the triangular-shaped member and further includes an urging means that urges the engagement means from the follower end such that the engagement means remains in substantial contact with the guide means as the follower end traverses the guide cylinder.

4. A drumming robot, comprising:
    the reciprocating mechanism of claim 1;
    a substantially humanoid support frame, including pulley means located at positions corresponding to any one or more of shoulder, elbow, wrist and hand;
    two strike members, each at an end of each of two arm members, wherein the strike members are pivotable between a striking position and a ready position; and
    a belt means connectable to the strike members and cooperating with the pulley means and the central pulley member;
    wherein rotation of the central pulley member causes displacement of the belt means and thereby effects movement of the strike members between the striking position and the ready position.

5. The drumming robot of claim 4, further including biasing means between each strike member and its corresponding arm member to return each strike member to the ready position from the striking position.

6. The drumming robot of claim 4, further including spacer means positioned upon limbs making up the support frame of the robot, wherein the spacer means are substantially disc-shaped.

7. The drumming robot of claim 6, further including a suit of armour.

* * * * *